No. 818,184.
PATENTED APR. 17, 1906.
C. MILLER.
TIRE.
APPLICATION FILED SEPT. 3, 1903.
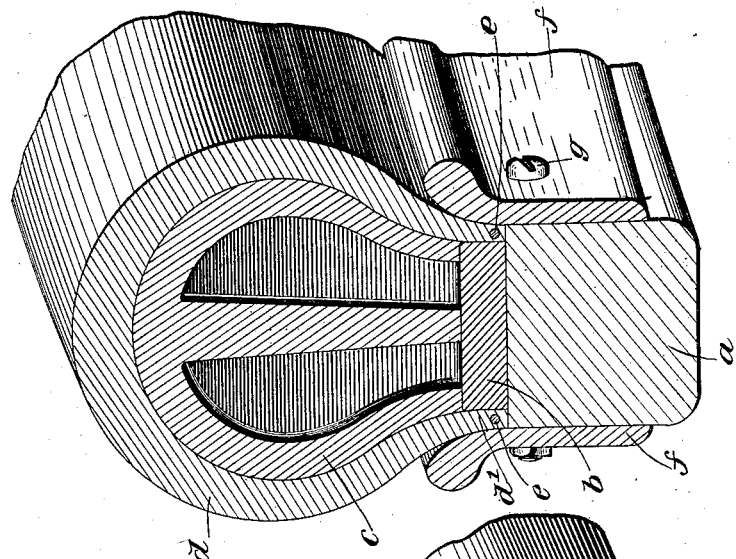
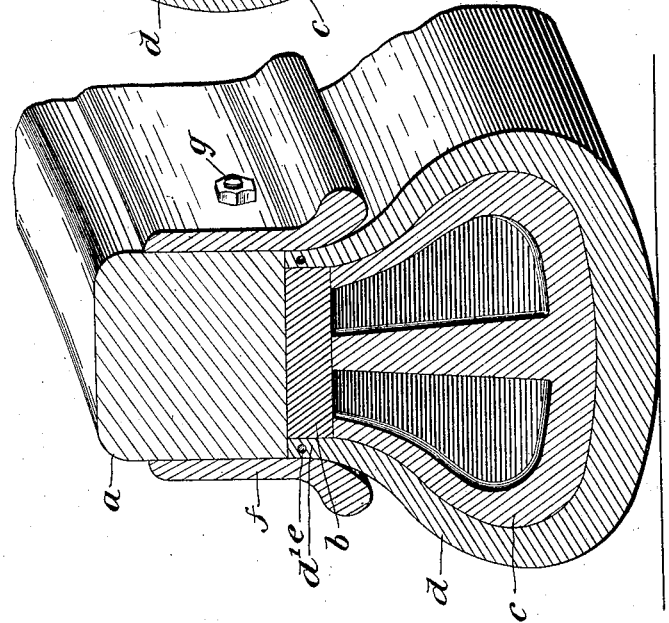
WITNESSES:
INVENTOR
Charles Miller
BY
ATTORNEYS

UNITED STATES PATENT OFFICE.

CHARLES MILLER, OF BINGHAMTON, NEW YORK.

TIRE.

No. 818,184. Specification of Letters Patent. Patented April 17, 1906.

Application filed September 3, 1903. Serial No. 171,762.

*To all whom it may concern:*

Be it known that I, CHARLES MILLER, a citizen of the United States, and a resident of Binghamton, in the county of Broome and State of New York, have invented a new and Improved Tire, of which the following is a full, clear, and exact description.

This invention relates to an improvement in what are known as "cushion-tires;" and it relates more specifically to the particular class of cushion-tires in which a resilient core is inclosed in an outer casing and the whole suitably fastened to the felly or rim of the wheel.

The object of the present invention is to increase the resiliency of the tire and to secure it to the felly in such a manner as to avoid all danger of creeping or other dislocation of the tire.

This specification is an exact description of one example of my invention, while the claims define the actual scope thereof.

Reference is to be had to the accompanying drawings, forming a part of this specification, in which similar characters of reference indicate corresponding parts in both the views.

Figure 1 is a perspective cross-section of the tire, showing it applied under pressure; and Fig. 2 is a similar view, excepting that the tire is here shown in its normal or noncompressed state.

$a$ indicates the rim or felly of the wheel, which is usually constructed of wood.

$b$ indicates an annular wooden strip, which is preferably made up of a number of arc-shaped sections placed around the outer circumference of the rim-section $a$.

$c$ indicates the interior cushion, which is formed of rubber with a number of cells therein, as illustrated, and the normal shape of which is that shown in Fig. 2—viz., a rounding outer portion running into a contracted or narrow base the width of which is just equal to that of the annular strip $b$.

$d$ indicates the outer casing of the tire, which is formed of rubber and canvas and conforms in all essential particulars to the shape of the core $c$, the outer or peripheral portion of the casing being thicker than its side portions for obvious reasons. The inner edges $d'$ of the casing $d$ project inward beyond the core $c$ and alongside of the strip $b$, and said inner edges are provided with wires $e$, which extend completely around the tire and are embedded in the rubber and canvas forming the casing.

Fastened to each side of the rim $a$ are metallic clamp-plates $f$, which may be either sectional or continuous, as desired, and which are held in place by bolts or similar fastenings $g$, extending transversely through the rim from side to side.

In assembling the tire as in the drawings the core is first inserted into the outer casing, and the core and casing are then moved into position encircling the felly or rim $a$, the tire being made slightly larger than the rim to facilitate this operation. The annular strip $b$ should then be inserted in sections between the core and the rim or felly, the inner edges of the casing $d$ lying against the shoulders formed by the side edges of the strip $b$. After this has been done the clamps $f$ are moved up bodily into position and held there by the fastening-bolts $g$, which causes the wired inner edges of the casing $d$ to be forcibly gripped between the clamps and the shoulders formed by the side edges of the strip $b$. This securely holds all parts of the tire in place.

The peculiar form of the core with its rounding outer portion and its contracted base and its cellular interior formation gives the core an exceedingly high degree of resiliency, and the finished tire is therefore almost as resilient as the pneumatic one. By means of the fastening effected by the coaction of the parts $f$ and $b$ with the outer casing I am enabled to secure the tire in position in such a way that it will be practically impossible for it to be accidentally dislocated.

Various changes in the form, proportions, and minor details of my invention may be resorted to at will without departing from the spirit and scope thereof. Hence I consider myself entitled to all such variations as may lie within the intent of my claims.

Having thus described my invention, I claim as new and desire to secure by Letters Patent—

1. In a vehicle-tire, the combination with the rim or felly of the wheel, of an annular strip extending around the periphery of the rim and of less width than the rim forming two annular shoulders at the side portions thereof, an interior cushion gradually decreasing in thickness from its outer or peripheral portion to its inner edges, and engaging at said edges the outer face of the strip and flush with the side edges thereof, a casing corresponding in shape to the interior cushion, and also gradually decreasing in thickness from its outer or peripheral portion to the extreme inner edges thereof, the inner edges of the casing projecting inward beyond the contracted inner edges of the interior cushion and engaging the side edges of said strip and contacting at the ends with the outer periphery of the rim, the contracted inner edges of said casing at the sides of the strip being provided with wires extending around the casing and embedded therein, annular clamping-plates engaging the sides of the felly or rim and extending outward beyond the shoulders formed by the side edges of the said strips, and means for holding the clamping-plates in place to cause the wired inner edges of the casing to be gripped between the clamping-plates and the side edges of said strips.

2. In a vehicle-tire, the combination with the rim or felly of the wheel, of a strip extending around the periphery of the rim, and of less width than the rim forming an annular shoulder extending around each side of the rim or felly, a casing decreasing in thickness from its outer or peripheral position to its extreme inner edges, the said contracted edges being placed against said shoulders, annular wires embedded in the inner contracted edges of the casing at points opposite the said shoulders on the rim, annular clamping-plates lying against the sides of the felly or rim and extending to points opposite said annular shoulders, the edges of said clamping-plates being enlarged and flared outwardly, and means for holding the clamping-plates in place, to cause the wired inner edges of the casing to be forcibly gripped between the clamping-plates and the said shoulders.

In testimony whereof I have signed my name to this specification in the presence of two subscribing witnesses.

CHARLES MILLER.

Witnesses:
E. M. DANES,
M. MILLER.